No. 791,633. PATENTED JUNE 6, 1905.
D. LIPPY & A. NICODEMUS.
TROLLEY.
APPLICATION FILED NOV. 7, 1904.
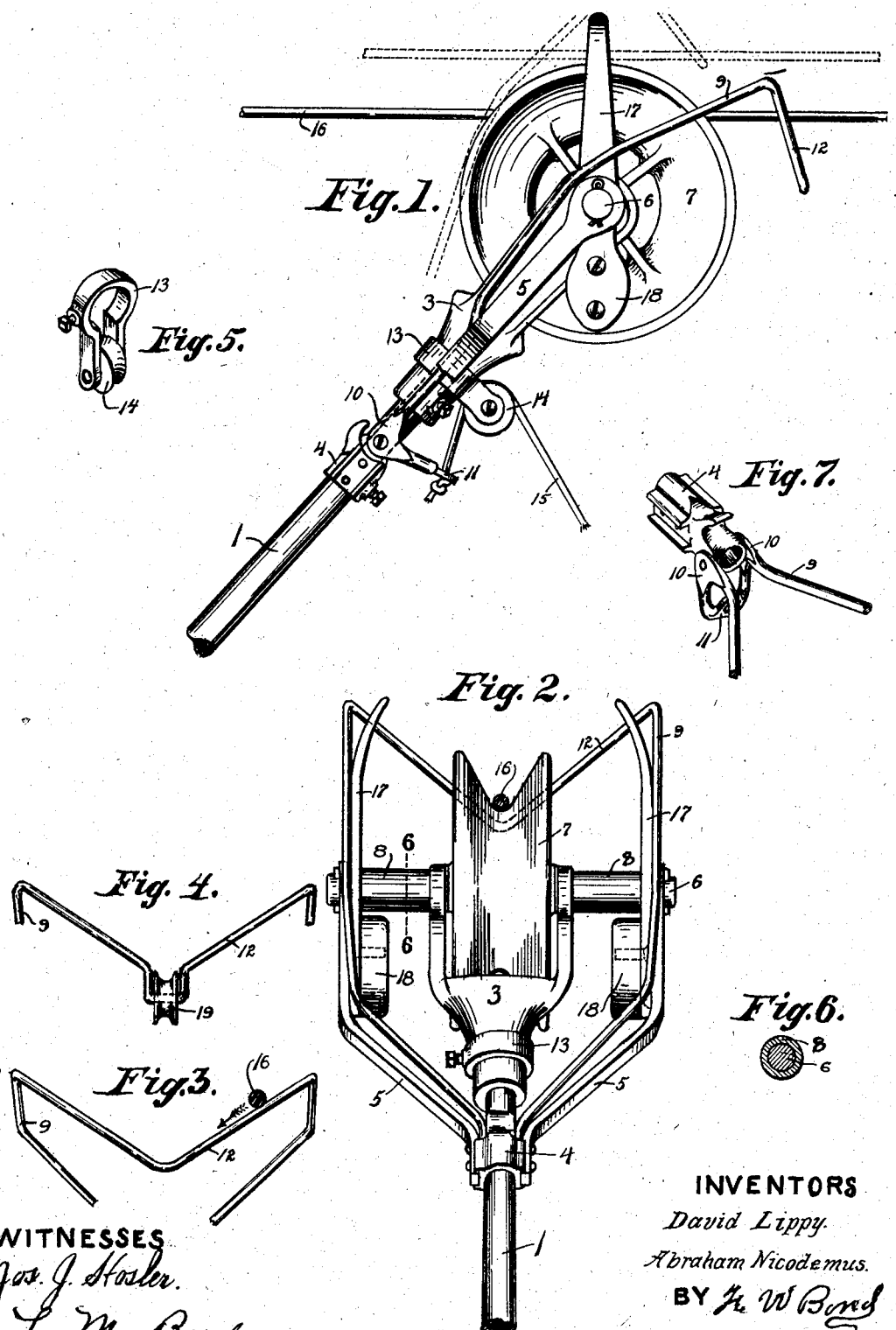
WITNESSES
Jos. J. Hosler.
L. M. Bond.
INVENTORS
David Lippy.
Abraham Nicodemus.
BY F. W. Bond
ATTORNEY No. 791,633. Patented June 6, 1905.

UNITED STATES PATENT OFFICE.

DAVID LIPPY AND ABRAHAM NICODEMUS, OF MANSFIELD, OHIO, ASSIGNORS OF ONE-THIRD TO GEORGE MOORHOUSE, OF MANSFIELD, OHIO.

TROLLEY.

SPECIFICATION forming part of Letters Patent No. 791,633, dated June 6, 1905.

Application filed November 7, 1904. Serial No. 231,611.

*To all whom it may concern:*

Be it known that we, DAVID LIPPY and ABRAHAM NICODEMUS, citizens of the United States, residing at Mansfield, in the county of Richland and State of Ohio, have invented certain new and useful Improvements in Trolleys; and we do hereby declare that the following is a full, clear, and exact description of the same, reference being had to the annexed drawings, making a part of this specification, and to the numerals of reference marked thereon, in which—

Figure 1 is a side elevation showing the trolley-wheel in contact with the trolley-wire. Fig. 2 is a front elevation of the trolley-harp, wheel, and finder. Fig. 3 is a rear end view of the finder. Fig. 4 is a rear end view of the finder, showing modifications. Fig. 5 is a detached view of the pulley-clip. Fig. 6 is a transverse section on line 6 6, Fig. 2. Fig. 7 is a detached perspective view of the head, showing a portion of the finder-wire and the manner of attaching the same to head.

The present invention has relation to improvements in trolleys; and it consists in the novel construction and arrangement hereinafter described, and particularly pointed out in the claims.

Similar numerals of reference indicate corresponding parts in all the figures of the drawings.

In the accompanying drawings, 1 represents the trolley-pole, which is of the usual construction and is attached to the car at its bottom or lower end in the usual manner. To the pole 1 is attached the trolley-wheel harp 3. To the block 4 or lower end of the pole-socket, as the case may be, are attached the arms 5, which arms diverge and through which arms and the arms of the harp 3 is located the trolley-wheel shaft 6, and, as shown in the drawings, the trolley-wheel shaft 6 is extended some distance beyond the side faces of the trolley-wheel 7, and upon the shaft 6 are located the sleeves 8, which sleeves are loosely mounted upon the shaft 6.

The trolley-wheel finder 9 consists of a wire frame bent substantially as shown in the drawings and is provided with the attaching ears or flanges 10, which ears or flanges may be flattened portions of wire or they may be made separate and the wire connected thereto; but as shown they are formed integral, and also the downward-extending portion 11 is also formed integral. The finder-frame 9 is extended some distance rearward and beyond the trolley-wheel 7, as illustrated in Fig. 1. The rear portion of the finder-frame 9 is provided with the inclined portions 12, which inclined portions converge from their upper bends toward their lower bend or junction, by which arrangement a V-shaped formation is provided. Upon the shank of the harp 3 is located the clip 13, which clip is provided with the pulley 14 and over which pulley is located the pull-rope 15 and the pull-rope connected to the downward-extending portion 11 of the finder-frame 9. When the construction shown in the drawings is used or employed, the block 4, to which the finder-frame proper is pivoted, is formed hollow throughout its length, so that the pole 1 can be passed through said head and into the socket of the harp 3. It will be understood that in applying our device to an old harp the finder-frame can be pivoted to the lower end of the harp-socket. By a down pull of the rope 15 the lower end of the downward-extending portion 11 will be pulled toward the pulley 14, thereby elevating the rear end of the finder-frame and bringing the inclined portions 12 in contact with the trolley-wire, and by a continued pull upon the rope the harp, together with the parts carried thereby, will be moved laterally to the trolley-wire 16 until the trolley-wire reaches the lowest point of the inclined portions 12, at which time the trolley-wheel 7 will be directly under the trolley-wire, and when the rope 15 is released, so as to allow the free end of the trolley-pole 1 to move upward, the trolley-wheel will be brought into proper contact with the trolley-wire 16. When the finder-frame 9 is in its normal position, the lower portion of the rear end will come below the trolley-wire and will not interfere in any manner with the movements of the trolley-wheel upon the trolley-wire, inasmuch as the rear portion of the finder can be so located and arranged that it will come below the switches and other obstacles along the path of the travel of the trolley-wheel.

By providing the sleeves 8 and locating them upon opposite sides of the trolley-wheel 7 they will be in position to engage with the trolley-wire 16 in the event the trolley-wheel 7 should become detached from the trolley-wire, and by loosely mounting the sleeves upon the shaft 6 said sleeves will be free to rotate during the time they are in contact with the trolley-wire, thereby preventing any cutting or grinding by frictional contact upon the trolley-wire.

For the purpose of preventing the harp or upper end of the trolley-pole from jumping laterally beyond the outer ends of the sleeves 8 the guard-arms 17 are provided, which guard-arms extend upward a short distance beyond the top of the trolley-wheel 7 and are normally held in that position by means of the lower weighted ends 18; but in the event the guard-arms 17 strike any obstruction they are free to turn in either direction and clear the obstruction, owing to the fact that the guard-arms are loosely mounted upon the trolley-wheel shaft 6.

The finder-frame 9 when in its normal position rests upon the arms 5, as illustrated in Figs. 1 and 2; but we do not desire to be confined to this particular arrangement, as the only object desired to be accomplished is to normally hold the finder in such a position that when it is turned upon its pivotal points or elevated, as illustrated in dotted lines, it will be in position to engage the trolley-wire.

In Fig. 4 a slight modification is shown, which consists in providing a roller 19, located at the lower rear portion of the finder-frame and in such relation that the trolley-wire will find its way into the grooved periphery of said roller at the time the harp is brought into position, so as to locate the trolley-wheel 7 directly under the trolley-wire 16.

Having fully described our invention, what we claim as new, and desire to secure by Letters Patent, is—

1. In a trolley, the combination of a trolley-pole and a harp carrying a trolley-wheel mounted upon a shaft, diverging arms held in fixed relation with the harp, and their rear ends spaced from the arms of the harp, sleeves loosely mounted upon the shaft of the trolley-wheel, and a finder-arm held in pivoted relation with the harp, and means for elevating the rear end of the finder, substantially as and for the purpose specified.

2. In a trolley of the class described, a trolley-pole and a harp, diverging arms held in fixed relation with the harp, a trolley-wheel shaft carried by the harp and the diverging arms, and a trolley-wheel mounted thereon, weighted guard-arms mounted upon the trolley-wheel shaft and spaced from the trolley-wheel, and a finder-frame pivotally attached to a block or head having a downward-extending portion, a pulley-clip located in the rear of the downward-extending portion of the finder, a pull-cord adapted to rock the finder upon its pivotal point, substantially as and for the purpose specified.

3. In a trolley of the class described, a trolley-pole and a harp carried thereby, diverging arms held in fixed relation with the harp, a trolley-wheel shaft formed of a length greater than the width of the harp, sleeves loosely mounted upon the trolley-wheel shaft and located upon opposite sides of the trolley-wheel, and weighted guard-arms pivotally mounted upon the trolley-wheel shaft and held in spaced relation with the trolley-wheel, substantially as and for the purpose specified.

4. In a trolley of the class described, a trolley-pole and a harp carried thereby, diverging arms held in fixed relation with the harp, a trolley-wheel shaft and a trolley-wheel mounted thereon, weighted guard-arms located upon the trolley-wheel shaft and extended above the top of the trolley-wheel and spaced from the sides of the trolley-wheel, substantially as and for the purpose specified.

5. In a trolley of the class described, the combination of a trolley-pole and a harp, a trolley-wheel mounted upon a shaft carried by the harp, said shaft having mounted thereon sleeves, weighted guard-arms pivotally attached to the shaft of the trolley-wheel and located upon opposite sides of the trolley-wheel, and sleeves mounted upon the shaft of the trolley-wheel and located between the harp and the guard-arms, and a pivoted finder, and means for rocking the finder independent of the movement of the harp, substantially as and for the purpose specified.

In testimony that we claim the above we have hereunto subscribed our names in the presence of two witnesses.

DAVID LIPPY.
ABRAHAM NICODEMUS.

Witnesses:
C. H. HUSTON,
A. S. BEACH.